(12) United States Patent
Golitschek Edler von Elbwart et al.

(10) Patent No.: US 10,798,737 B2
(45) Date of Patent: Oct. 6, 2020

(54) UPLINK TRANSMISSION INDICATION

(71) Applicant: Panasonic Intellectual Property Corporation of America, Torrance, CA (US)

(72) Inventors: Alexander Golitschek Edler von Elbwart, Hessen (DE); Joachim Loehr, Hessen (DE); Michael Einhaus, Darmstadt (DE); Sujuan Feng, Frankfurt (DE); Prateek Basu Mallick, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 164 days.

(21) Appl. No.: 15/754,276

(22) PCT Filed: Aug. 12, 2016

(86) PCT No.: PCT/EP2016/069224
§ 371 (c)(1),
(2) Date: Feb. 21, 2018

(87) PCT Pub. No.: WO2017/032619
PCT Pub. Date: Mar. 2, 2017

(65) Prior Publication Data
US 2019/0124688 A1   Apr. 25, 2019

(30) Foreign Application Priority Data
Aug. 21, 2015   (EP) ..................................... 15182068

(51) Int. Cl.
*H04W 74/08*   (2009.01)
*H04W 16/14*   (2009.01)
(Continued)

(52) U.S. Cl.
CPC .......... *H04W 74/0808* (2013.01); *H04L 1/00* (2013.01); *H04L 1/1671* (2013.01);
(Continued)

(58) Field of Classification Search
CPC ............. H04W 74/0808; H04W 16/14; H04W 72/1268; H04W 72/1284; H04W 72/14
(Continued)

(56) References Cited

U.S. PATENT DOCUMENTS

2006/0007952 A1\* 1/2006 Oishi .................... H04W 28/06
370/465
2015/0023315 A1   1/2015 Yerramalli et al.
(Continued)

FOREIGN PATENT DOCUMENTS

| JP | 2015-179994 A | 10/2015 |
|---|---|---|
| WO | 2014/201614 A1 | 12/2014 |
| WO | 2016/148243 A1 | 9/2016 |

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.
(Continued)

*Primary Examiner* — Christopher R Crompton
(74) *Attorney, Agent, or Firm* — Seed IP Law Group LLP

(57) ABSTRACT

The invention relates to transmitting and receiving data in subframes of a wireless communication system. It includes at the user equipment receiving an uplink grant for transmitting data on predetermined resources of an uplink carrier; detecting by carrier sensing whether or not the predetermined resources are available for transmission; and if the predetermined resources are detected to be available for transmission, transmitting data in the predetermined
(Continued)

resources and transmitting a transmission confirmation indication indicating that the data has been transmitted. At the receiving side, the transmission confirmation indication is transmitted and based on, the received data is handled.

17 Claims, 7 Drawing Sheets

(51) Int. Cl.
    *H04L 1/18*     (2006.01)
    *H04L 1/16*     (2006.01)
    *H04L 1/00*     (2006.01)
    *H04W 72/12*     (2009.01)
    *H04W 72/14*     (2009.01)

(52) U.S. Cl.
    CPC .......... *H04L 1/1835* (2013.01); *H04L 1/1861* (2013.01); *H04W 16/14* (2013.01); *H04W 72/1268* (2013.01); *H04W 72/1284* (2013.01); *H04W 72/14* (2013.01); *H04W 72/1289* (2013.01)

(58) Field of Classification Search
    USPC .......................................................... 370/330
    See application file for complete search history.

(56) References Cited

U.S. PATENT DOCUMENTS

| | | | |
|---|---|---|---|
| 2015/0103715 A1 | 4/2015 | Chen et al. | |
| 2015/0319800 A1* | 11/2015 | Park | H04W 76/15 370/329 |
| 2016/0345381 A1* | 11/2016 | Van Phan | H04W 76/36 |
| 2017/0034865 A1* | 2/2017 | Jung | H04W 76/27 |
| 2017/0142770 A1* | 5/2017 | Fu | H04L 1/1614 |
| 2018/0235010 A1* | 8/2018 | Harada | H04W 16/14 |
| 2019/0364581 A1* | 11/2019 | Anderson | H04W 72/1226 |

OTHER PUBLICATIONS

3GPP TS 36.211 V12.6.0, "3$^{rd}$ Generation Partnership Project; Technical Specification Group Radio Access Network; Evolved Universal Terrestrial Radio Access (E-UTRA); Physical channels and modulation (Release 12)," Jun. 2015, 136 pages.

3GPP TS 36.212 V12.4.0, "3$^{rd}$ Generation Partnership Project; Technical Specification Group Radio Access Network; Evolved Universal Terrestrial Radio Access (E-UTRA); Multiplexing and channel coding (Release 12)," Mar. 2015, 94 pages.

3GPP TS 36.212 V12.6.0, "3$^{rd}$ Generation Partnership Project; Technical Specification Group Radio Access Network; Evolved Universal Terrestrial Radio Access (E-UTRA); Multiplexing and channel coding (Release 12)," Sep. 2015, 95 pages.

3GPP TS 36.213 V12.6.0, "3$^{rd}$ Generation Partnership Project; Technical Specification Group Radio Access Network; Evolved Universal Terrestrial Radio Access (E-UTRA); Physical layer procedures (Release 12)," Jun. 2015, 241 pages.

3GPP TR 36.889 V13.0.0, "3$^{rd}$ Generation Partnership Project; Technical Specification Group Radio Access Network; Study on Licensed-Assisted Access to Unlicensed Spectrum (Release 13)," Jun. 2015, 286 pages.

ETSI EN 301 893 V1.8.0, "Broadband Radio Access Networks (BRAN); 5 GHz high performance RLAN; Harmonized EN covering the essential requirements of article 3.2 of the R&TTE Directive," *Harmonized European Standard*, Jan. 2015, 93 pages.

Extended European Search Report, dated Feb. 29, 2016, for corresponding European Patent Application No. 15182068.5—1857, 8 pages.

Kyocera, "LAA UL Design," R1-151464, 3GPP TSG RAN WG1 Meeting #80bis, Agenda Item: 7.2.4.2, Belgrade, Serbia, Apr. 20-24, 2015, 4 pages.

Sesia et al., "LTE—The UMTS Long Term Evolution: From Theory to Practice," Ch. 9.3, Wiley, 2011, 22 pages.

International Search Report, dated Sep. 2, 2016, for related International Patent Application No. PCT/EP2016/069224, 3 pages.

Japanese Office Action, dated Mar. 3, 2020, for Japanese Application No. 2018-506854, 13 pages. (With English machine translation).

* cited by examiner

UPLINK TRANSMISSION INDICATION

BACKGROUND

Technical Field

The present disclosure relates to transmission and reception of data on a band shared by two separate wireless systems so that a listen before talk procedure is employed before transmission even for scheduled data.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL}N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell)

configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
For each SCell the usage of uplink resources by the UE in addition to the downlink ones is configurable (the number of DL SCCs configured is therefore always larger or equal to the number of UL SCCs, and no SCell can be configured for usage of uplink resources only)
The downlink PCell cannot be de-activated, unlike SCells
Re-establishment is triggered when the downlink PCell experiences Rayleigh fading (RLF), not when downlink SCells experience RLF
Non-access stratum information is taken from the downlink PCell
PCell can only be changed with handover procedure (i.e., with security key change and RACH procedure)
PCell is used for transmission of PUCCH
The uplink PCell is used for transmission of Layer 1 uplink control information
From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as "DL anchor carrier". Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 1/Layer 2 Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs to be transmitted only once per TTI. Without loss of generality, the following assumes that a TTI is equivalent to one subframe.

The L1/L2 control signaling is transmitted on the Physical Downlink Control Channel (PDCCH).

A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfils basically the same function as the PDCCH, i.e., conveys L1/L2 control signaling, even though the detailed transmission methods are different from the PDCCH. Further details can be found particularly in the current versions of 3GPP TS 36.211 and 36.213, v12.6.0, June 2015, titled "Evolved Universal Terrestrial Radio Access (E-UTRA); Physical layer procedures", available at www.3gpp.org, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;
Resource allocation information, indicating the resources (e.g., Resource Blocks, RBs) on which a user is allocated. Alternatively this information is termed resource block assignment (RBA). Note, that the number of RBs on which a user is allocated can be dynamic;
Carrier indicator, which is used if a control channel transmitted on a first carrier assigns resources that concern a second carrier, i.e., resources on a second carrier or resources related to a second carrier; (cross carrier scheduling);
Modulation and coding scheme that determines the employed modulation scheme and coding rate;
HARQ information, such as a new data indicator (NDI) and/or a redundancy version (RV) that is particularly useful in retransmissions of data packets or parts thereof;
Power control commands to adjust the transmit power of the assigned uplink data or control information transmission;
Reference signal information such as the applied cyclic shift and/or orthogonal cover code index, which are to be employed for transmission or reception of reference signals related to the assignment;
Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single code word PDSCH transmissions (downlink transmission modes 1, 2 and 7).

Format 1A: DCI Format 1A is used for compact signaling of resource assignments for single code word PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The PDCCH carries DCI on an aggregation of one or a plurality of consecutive control channel elements (CCEs). A control channel element corresponds to 9 resource element groups (REG) of which each consists of four or six resource elements.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC.

A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

LTE on unlicensed bands—Licensed-Assisted Access LAA

In September 2014, 3GPP initiated a new study item on LTE operation in unlicensed spectrum which has been concluded with TR 36.889, v13.0.0 of June 2015, titled "Study on Licensed-Assisted Access to Unlicensed Spectrum", available at www.3gpp.org in June 2015. A corresponding work item addressing the specification of LTE for unlicensed band operation was initiated in June 2015 and will start in August 2015 at 3GPP RAN1#82. The reason for extending LTE to unlicensed bands is the ever-growing demand for wireless broadband data in conjunction with the limited amount of licensed bands. Unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation in unlicensed bands will therefore at least in the beginning be considered rather a complement to LTE on licensed spectrum than stand-alone operation in unlicensed spectrum. Based on this assumption, 3GPP established the term Licensed Assisted Access (LAA) for the LTE operation in unlicensed bands in conjunction with at least one licensed band. Future stand-alone operation of LTE in unlicensed spectrum without relying on LAA is however not excluded.

The current intended general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same carrier) and cross-carrier scheduling between cells (scheduling information in terms of PDCCH/EPDCCH and user data in terms of PDSCH/PUSCH are transmitted on different carriers).

The basic envisioned approach at 3GPP is that the PCell will be operated on a licensed band while one or more SCells will be operated in unlicensed bands. The benefit of this strategy is that the PCell can be used for reliable transmission of control messages and user data with high quality of service (QoS) demands, such as for example voice and video, while a PCell in unlicensed spectrum might yield, depending on the scenario, to some extent significant QoS reduction due to inevitable coexistence with other RATs. A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed at 3GPP, that the LAA investigation and specification will focus in unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as fairness between different LTE operators in the same unlicensed band, the channel access of LTE for unlicensed bands has to abide by certain sets of regulatory rules which depend on region and considered frequency band. A comprehensive description of the regulatory requirements for operation in unlicensed bands at 5 GHz is given in TR 36.889, cited above. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of the 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, that is associated with the master, to implement the radar detection.

The operation in unlicensed bands at 5 GHz is in most regions limited to rather low transmit power levels compared to the operation on licensed bands resulting in small coverage areas. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum time during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM or SC-FDMA symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 4, the figure being taken from ETSI EN 301 893 (there FIG. 2: "Example of timing for Frame Based Equipment").

Considering the different regulatory requirements, it is apparent that the LTE specification for operation in unlicensed bands will require several changes compared to the current Rel-12 specification that is limited to licensed band operation.

LAA Downlink Burst

In contrast to LTE operation in licensed bands, the character of unlicensed band operation is shaped by discontinuous transmissions due to the required LBT behavior in combination with restriction of the maximum allowed channel occupation duration as described above.

LAA downlink transmissions therefore exhibit a burst structure, where each transmission burst is preceded by a listening phase serving the clear channel assessment (CCA) and the continuous signal transmission from the eNB. This signal transmission phase can comprise a multitude of different signals in addition to the data bearing signals; such as for example reservation signals, synchronization signals and reference signals. This signal transmission phase will be referred to as LAA downlink burst in the following. Each LAA downlink burst comprises typically multiple LTE subframes.

It has been agreed at RAN1 during the LAA study item phase that the subframe boundaries of a licensed PCell and an unlicensed SCell will be aligned as described in TR 36.889, cited above. In particular, the subframe boundaries will not be adapted to the channel occupation conditions that determine the channel access behavior by means of clear channel assessment (CCA). However, Wi-Fi nodes that operate in the same band with the LTE node will not follow the LTE subframe boundary pattern which means that the channel can become free at any moment within the LTE subframe boundaries.

Both the base station and the user equipment, have to perform CCA before transmitting data. In other words, transmission on the unlicensed carrier generally has to follow the LBT procedure. Thus, the availability of the channel at the desired time of transmission cannot be always guaranteed.

BRIEF SUMMARY

Based on the above described background, a transmitter may have several reasons not to transmit the data: a) the DCI including the scheduling grant was not received (correctly) due to errors; b) conflicting DCI have been received due to an error (false alarm resulting from wrongly recognizing a DCI as valid)—resulting in not following either DCI; or c) the unlicensed carrier may be occupied by another transmission at the desired transmission time (scheduled time). Presently there are no means for unambiguously distinguishing the cause of missing transmission.

Not distinguishing between these different causes may cause delay and overhead especially in combination with HARQ applying incremental redundancy with multiple redundancy versions. A particular problem results from cause c). If the transmitter detects another transmission and refrains from transmitting the scheduled data, the receiver may possibly interpret the other transmission as the scheduled one and process corrupt data. Even if CRC may reveal that the data were incorrectly received, the receiver shall try to combine them with the other (later) redundancy versions. However, since the other transmission has nothing to do with the scheduled data, the entire combining buffer content may be distorted so that not even subsequent retransmissions may help decoding the data successfully.

Accordingly, the aim of the present disclosure is to improve the efficiency of HARQ operating on an unlicensed band. This may be particularly advantageous for uplink data transmissions.

The independent claims provide non-limiting and exemplary embodiments. Advantageous embodiments are subject to the dependent claims.

One non-limiting and exemplary embodiment provides an improved method for transmitting a data in subframes of a wireless communication system, including the following steps to be performed by a user equipment, UE, device: receiving an uplink grant for transmitting data on predetermined resources of an uplink carrier; detecting by carrier sensing whether or not the predetermined resources are available for transmission; if the predetermined resources are detected to be available for transmission, transmitting data in the predetermined resources and transmitting a transmission confirmation indication indicating that the data has been transmitted.

Another non-limiting and exemplary embodiment provides a method for receiving data in subframes of a wireless communication system, including the following steps to be performed by a base station: generating an uplink grant for a user equipment to transmit data on predetermined resources of an uplink carrier; receiving data in the predetermined resources; receiving a transmission confirmation indication indicating that the data has been transmitted by the user equipment.

Another non-limiting and exemplary embodiment provides an apparatus for transmitting a data in subframes of a wireless communication system, including: reception unit for receiving an uplink grant for transmitting data on predetermined resources of an uplink carrier; carrier sensing unit for detecting by carrier sensing whether or not the predetermined resources are available for transmission; and transmitting unit for, if the predetermined resources are detected to be available for transmission, transmitting data in the predetermined resources and transmitting a transmission confirmation indication indicating that the data has been transmitted.

Another non-limiting and exemplary embodiment provides an apparatus for receiving data in subframes of a wireless communication system, including: scheduler for generating an uplink grant for a user equipment to transmit data on predetermined resources of an uplink carrier; data receiver for receiving data in the predetermined resources; and control receiver for receiving a transmission confirmation indication indicating that the data has been transmitted by the user equipment.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE FIGURES

In the following exemplary embodiments are described in more detail with reference to the attached figures and drawings.

DETAILED DESCRIPTION

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band, alternatively called sometimes a "license-exempt frequency band". Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

The unlicensed cells of a system may differ from the licensed cells in particular in that their resources are shared with transmission of other devices working according to different standards, i.e., not being scheduled by the system. Accordingly, even if the system schedules transmissions also on the unlicensed cell, still carrier sensing is necessary before effectively transmitting the scheduled data.

Figure 5:
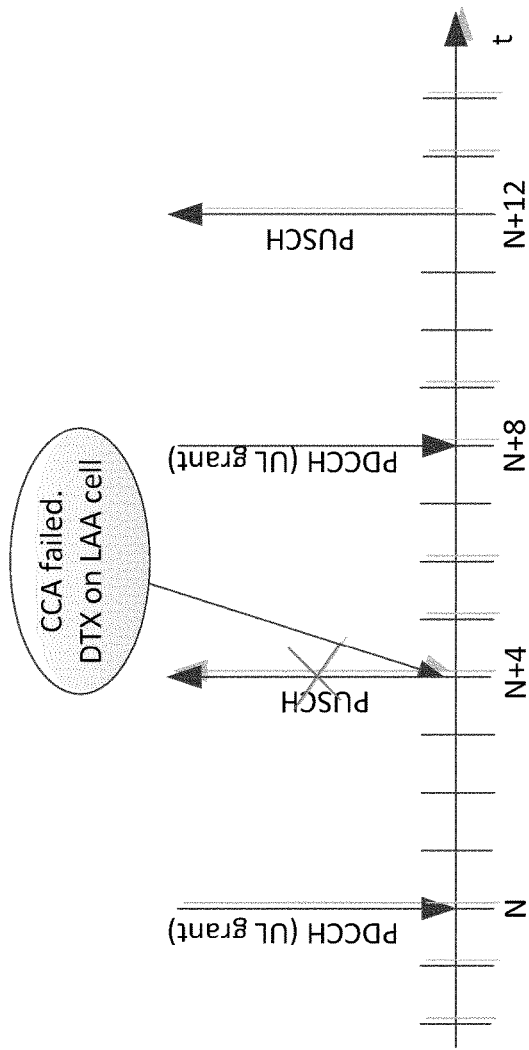
FIG. 5 is a schematic drawing illustrating scheduled transmission on an LBT carrier.

FIG. 5 illustrates the problem underlying the present disclosure. Axis x denotes subframes in the time domain. It is assumed that the licensed band operates within subframes of a predefined duration. The figure shows time point N corresponding to subframe with a subframe number N at which an uplink grant is received at a UE on a PDCCH, i.e., within downlink control information (DCI). According to current LTE-A specifications (Release 12), the data scheduled by the uplink grant are to be transmitted in (N+4)-th subframe, i.e., 4 subframes after reception of the grant. Correspondingly, FIG. 5 shows at time point N+4 a transmission by the UE on a PUSCH, which failed. The transmission in this example failed due to failed CCA. In other words, when performing LBT procedure, the UE detected that the channel appears to be busy/occupied, e.g., due to a transmission by another entity on the scheduled resources.

Such transmission may be, for instance, a WLAN transmission. Consequently, the UE does not initiate or stops transmission, i.e., performs discontinuous transmission (DTX) on the LAA cell. In this situation, the base station (eNB) which transmitted the DCI including the grant for this transmission however still expects to receive data from the UE. Thus, it decodes the data which it detects on the scheduled resources. Since the data detected rather corresponds to a noise and/or transmission by the other system (WLAN), it is likely that an erroneous decoding will be detected, e.g., by checking the CRC. However, in order to make use of Hybrid ARQ combining, the data detected will still be stored into the combining buffer and combined with possible earlier or later (re-) transmissions.

Such storing of completely different data into combining buffer and usage thereof for combining with other transmissions cannot improve the data decoding. On the contrary, the presence of different data may distort the entire decoding result.

FIG. 5 further illustrates another reception of an uplink grant on the PDCCH in (N+8)-th subframe and a subsequent PUSCH transmission of data four subframes later, i.e., in subframe N+12. In this example, this transmission took place since CCA was successful and the scheduled resources free.

In order to avoid combining buffer distortion, the eNB may try to detect whether the UE is transmitting by performing the carrier sensing. If a substantial power is received on the expected time-frequency resources, the eNB assumes that the desired UE has been transmitting data. However, in presence of another transmitter such as a WLAN transmitter, sufficient power may be measured even if the UE has not transmitted due to failed CCA. On the other hand, a UE on the far end of the unlicensed cell may fall below the detection threshold and its transmission could be ignored.

Another possibility is to base the detection of presence of a transmission from the UE on reference symbol correlation. However, this approach may still lead to both, missed detections and false detections of the UE transmission.

According to the present disclosure, thus, the UE transmits a confirmation signal (confirmation indication) which indicates that the UE transmitted its data. Based on this confirmation indication, the eNB is notified whether or not the UE in fact succeeded in transmitting data and may discard the corresponding received data from the combining buffer in case the UE did not succeed.

The detecting whether or not the predetermined resources are available for use includes a measurement on at least part of the predetermined resources. This measurement may be for instance a mere measurement of signal power in the resources. However, this disclosure is not limited thereto and the measurement may also include matching the received signal with the predefined reference sequences and measuring the received quality of the sequences. For example, PN sequences with good autocorrelation properties may be correlated with the received signal and the best correlation between a PN sequence and the received signal may serve for deciding whether or not the resources are available. The resources are not available for instance when another wireless system performs transmission thereon. However it is noted that the same result, i.e., non-availability of the resources may be detected in case of high noise or interference.

For the LTE/LTE-A system, a UE is transmitting data in uplink on a physical uplink shared channel (PUSCH) when it received an uplink grant included in a downlink control information transmitted on a PDCCH (physical downlink control channel). According to the present disclosure when the UE transmits a PUSCH, it also additionally transmits the confirmation indication. The transmission of the confirmation indication can be performed in various different ways, possibly depending on the system configuration.

For instance, according to an embodiment of this disclosure, the confirmation indication is transmitted in the PUSCH subframe in which also the data are transmitted (e.g., in case of a successful CCA) or should have been but were not transmitted (e.g., in case of a failed CCA). It is advantageous if this confirmation indication is transmitted following current procedures for transmitting uplink control information (UCI) such as feedback information in uplink, which means feedback information concerning the downlink transmissions from the base station to the UE. This is possible as long as there has been a downlink data transmission. In particular, the confirmation indication can be multiplexed into the PUSCH in a similar way as positive or negative acknowledgements (ACK/NACK) for a PDSCH channel or DL-SCH data, Rank Indicator (RI), Channel quality indicator (CQI) or pre-coding matrix indicator (PMI). The current multiplexing of this feedback information is described in detail in TS 36.212, Sections 5.2.2.7, 5.2.3 and 5.2.4 whereas the transmission of the PUSCH and PUCCH on the physical layer and thus mapping of the PUSCH and PUCCH onto the physical resources is shown in TS 36.211, Section 5.3. Handling of the UCI is described in TS 36.213, Section 10.1.

For instance, the confirmation indication can be multiplexed in adjacency of demodulation reference signal (DM-RS). Such multiplexing provides the advantage of better reception quality since the adjacency to the DM-RS signal ensures a higher quality of channel quality detection. In particular, the confirmation indication is multiplexed on the PUSCH within the time frequency grid on the same subcarrier as the DM-RS signal and in the adjacent SC-FDMA symbol. In other words, advantageously the confirmation indication is mapped in the SC-FDMA symbols directly neighboring with the DM-RS signal, or more generally neighboring (in terms of time/frequency resources) to resources that carry information serving as a reference for estimating the channel.

The confirmation indication may have one or more bits. This one or more bit may be expressed by a predefined or pre-configured sequence of bits which is then mapped on the corresponding modulation symbol or symbols of a pre-determined modulation order. If there are more than one symbols corresponding to the confirmation indication, they are mapped in the direction of frequency domain (including more than one subcarrier).

Figure 1:
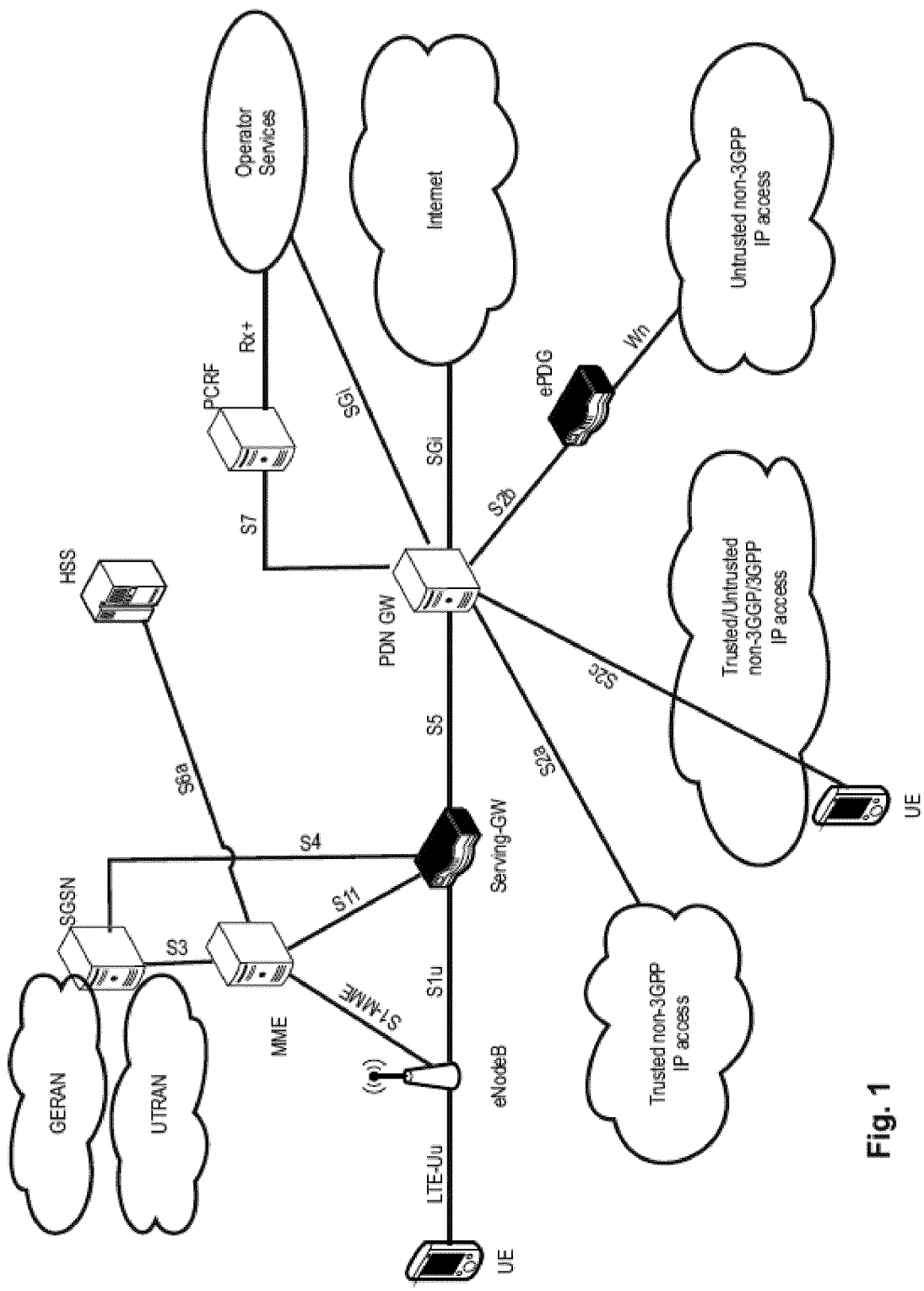
FIG. 1 shows an exemplary architecture of a 3GPP LTE system.
Figure 2:
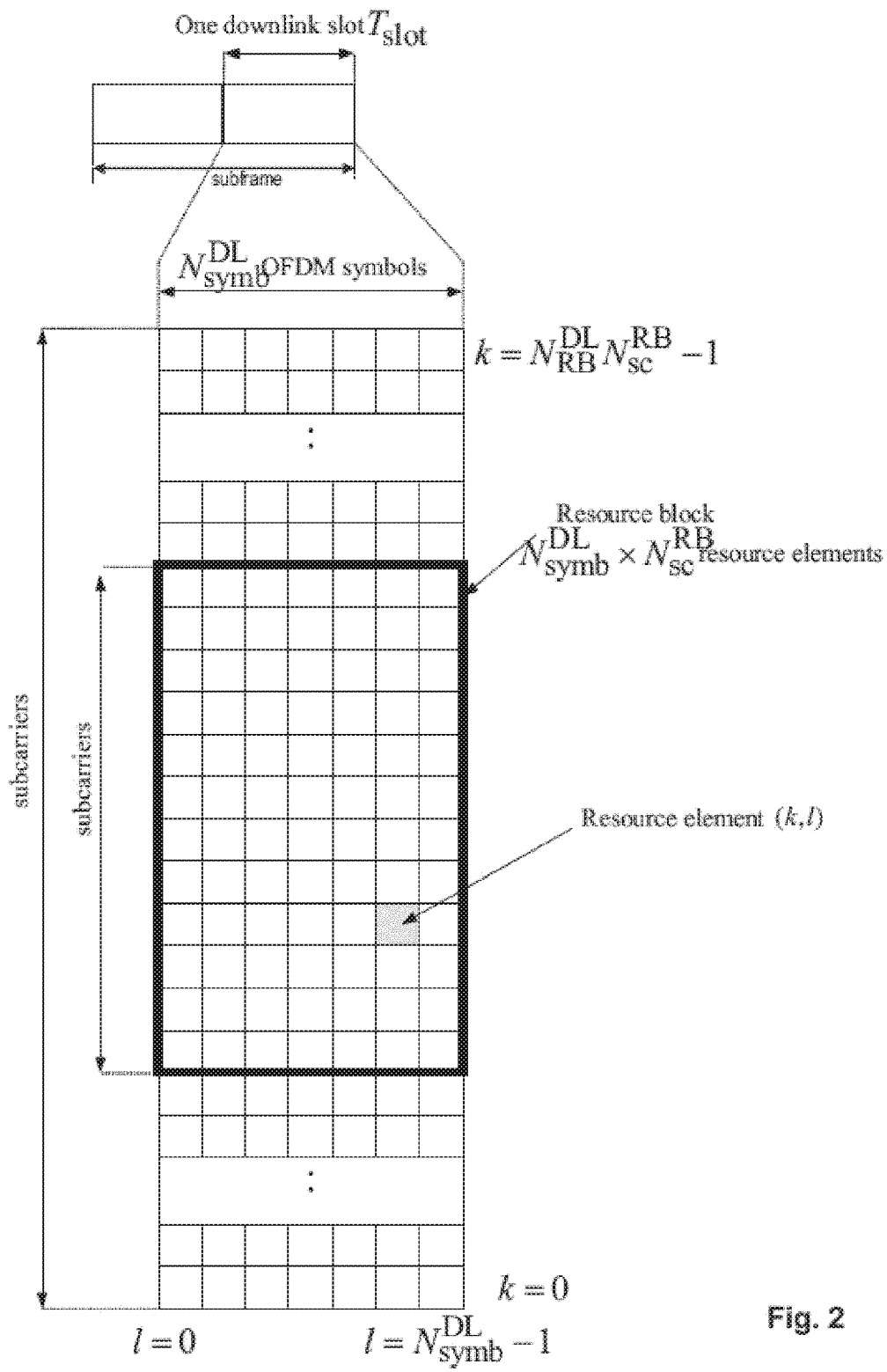
FIG. 2 shows an exemplary downlink resource grid of a downlink slot of a subframe as defined for 3GPP LTE (Release 8/9)
Figure 3:
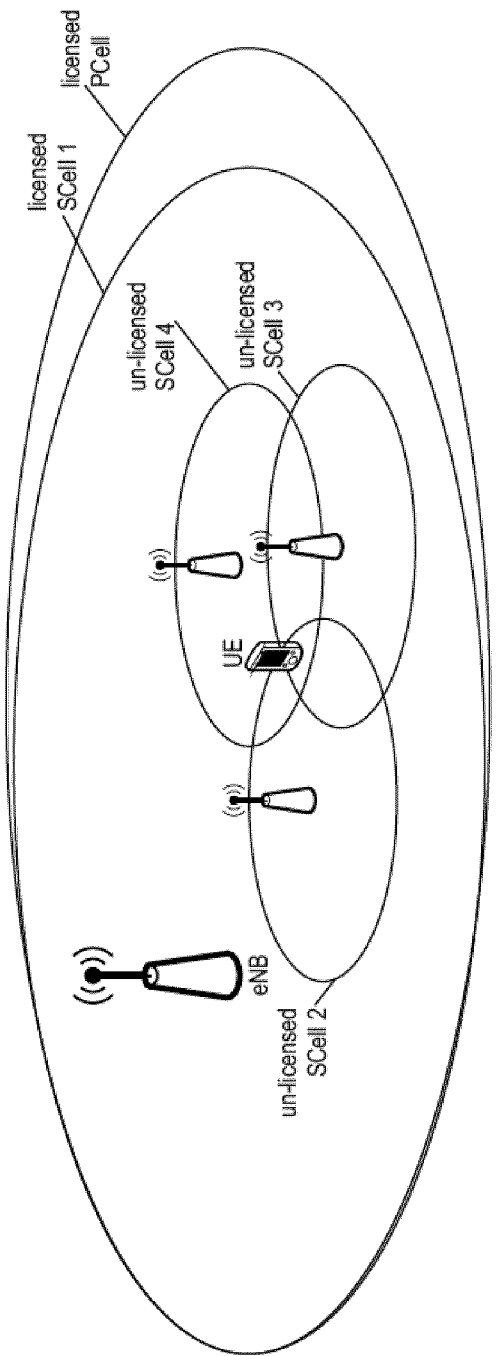
FIG. 3 illustrates an exemplary licensed-assisted access scenario, with various licensed and unlicensed cells.
Figure 4:
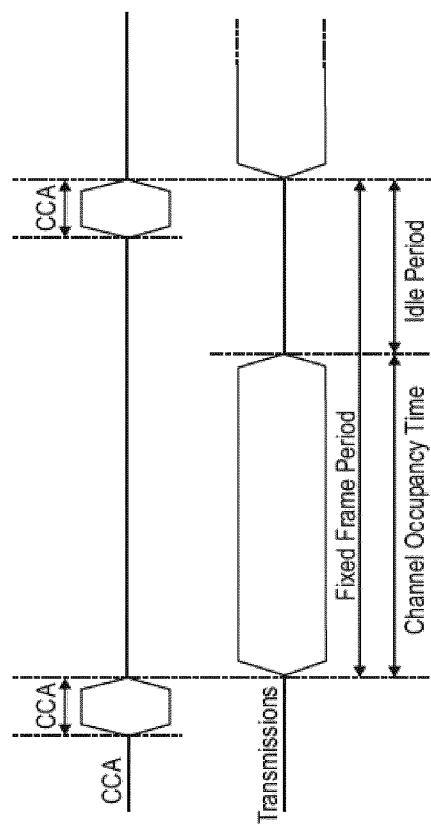
FIG. 4 illustrates schematically the transmission timing on an unlicensed band, including the different periods, Channel Occupancy Time, Idle Period, and Fixed Frame Period.
Figure 6:
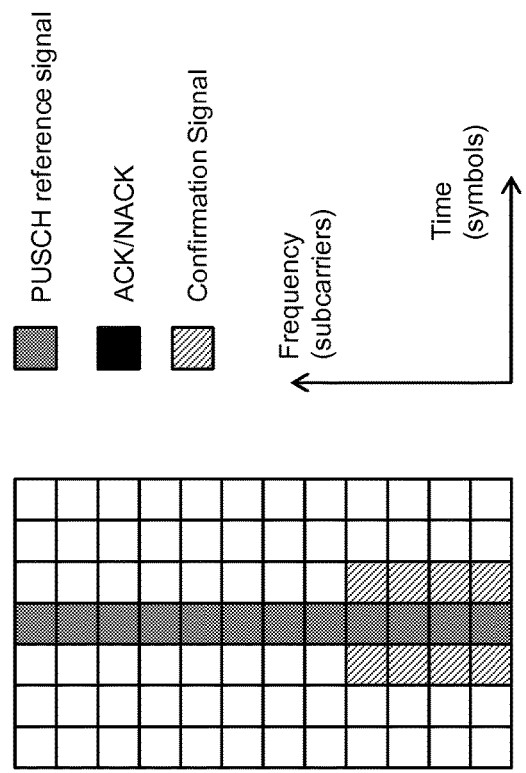
FIG. 6 is a schematic drawing illustrating an exemplary mapping of the confirmation signal onto the PUSCH resources.

An example of mapping the confirmation indication onto the physical resources is shown in FIG. 6. In particular, FIG. 6 shows a resource grid of a time slot including 7 symbols (SC-FDMA) in time domain and 12 subcarriers in frequency domain, i.e., it depicts a resource block for a normal cyclic prefix length in LTE/LTE-A like shown in FIG. 2. The fourth symbol is entirely used for uplink reference signal (DM-RS), i.e., all subcarriers of the fourth symbol are carrying uplink RS in this example. As can be seen, the confirmation indication feedback is mapped along the RS signal adjacently to the left and right of the RS signal in the time domain. In this example, ACK/NACK is not transmitted in this PUSCH.

Figure 7:
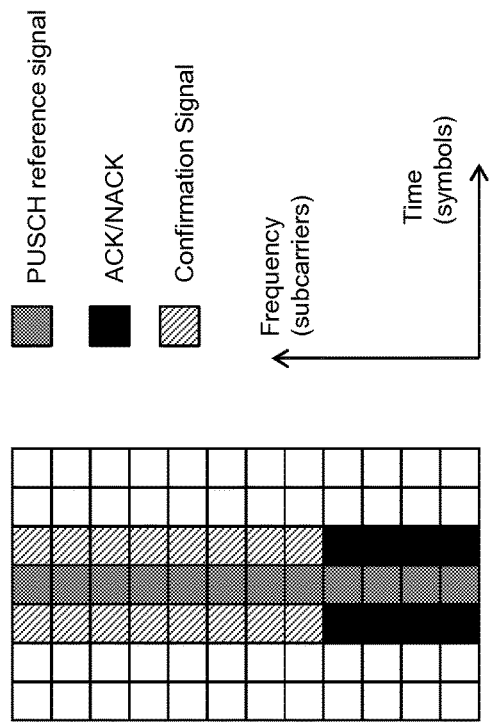
FIG. 7 is a schematic drawing illustrating an exemplary mapping of the confirmation signal onto the PUSCH resources.

FIG. 7 illustrates another example in which the confirmation indication is mapped as a continuation of the ACK/NACK mapping along the RS in frequency (mapping onto the subcarriers directly adjacent to the RS in time domain and not used for transmission of ACK/NACK). It is noted that these figures are exemplary. For instance, in FIG. 7, there are eight resource elements on each side of the RS. However, the present disclosure is not limited thereto and any number of resource elements (one or more) may be used to carry the confirmation indication or a plurality of confirmation indications in the PUSCH resource grid. Similarly, FIG. 6 merely shows an example in which there are four resource elements used for the confirmation signal on both sides of the RS. However, this is not to limit the present disclosure. Any one or more such resource elements may be used. An alternative mapping that keep the DM-RS vicinity property includes the case that ACK/NACK are mapped to a symbol preceding/succeeding the DM-RS, while the confirmation indication is mapped to a symbol succeeding/preceding the DM-RS, respectively. In general, the mapping of the confirmation indication is not necessarily symmetrical with respect to the location of RS, i.e., it can be mapped to symbols preceding or following the RS.

Figure 8:
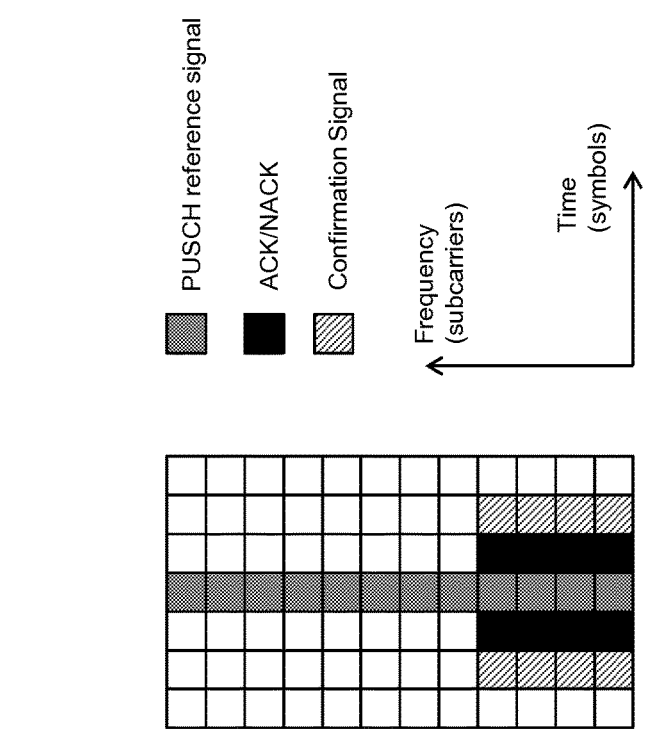
FIG. 8 is a schematic drawing illustrating an exemplary mapping of the confirmation signal onto the PUSCH resources.
Figure 9:
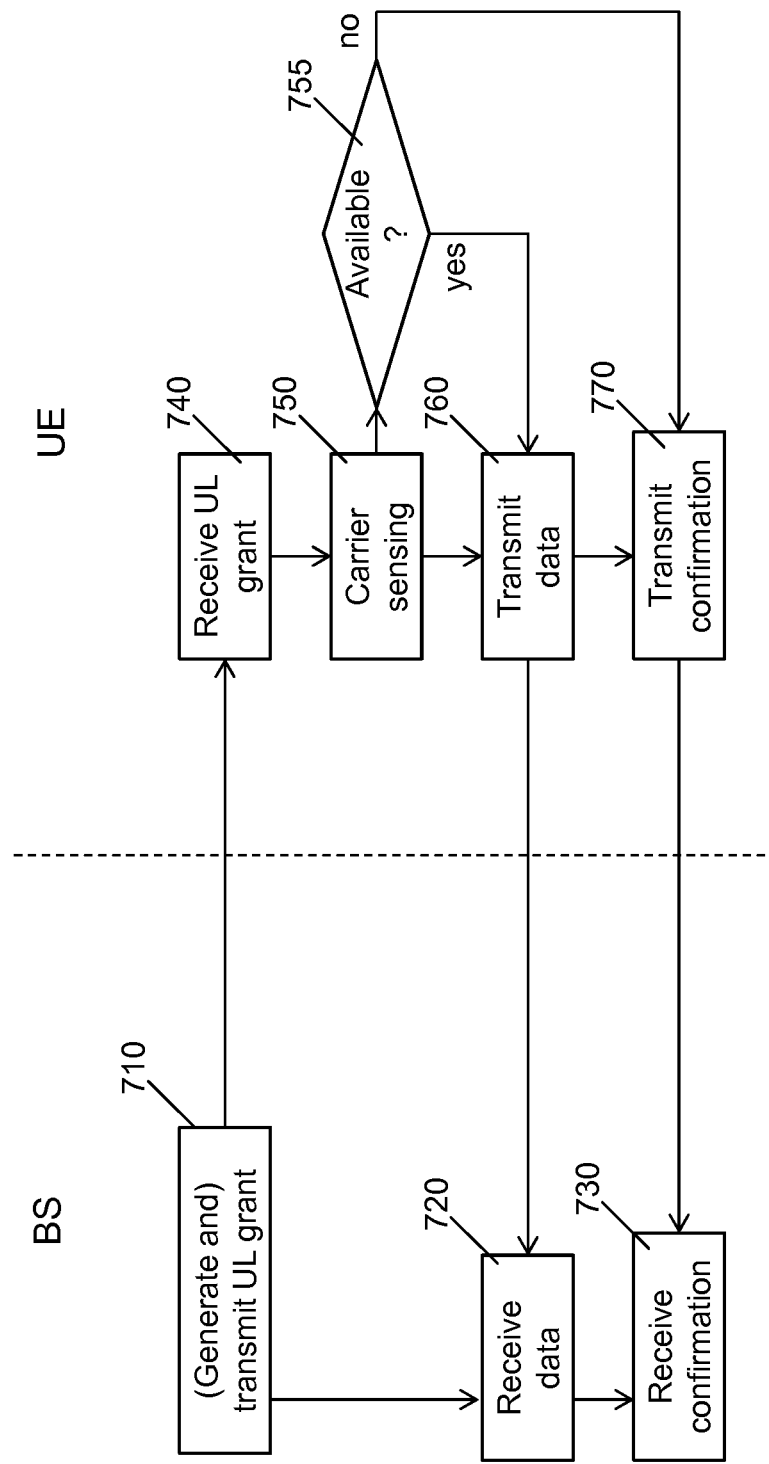
FIG. 9 is a flow diagram illustrating a method for transmitting data in uplink.

Another example is shown in FIG. 8. In FIG. 8, the ACK/NACK symbols are mapped in direct adjacency to the RS signal. The confirmation signal is then mapped adjacently (in the proximity of) to the symbols carrying ACK/NACK, i.e., in the symbols not directly adjacent to the RS symbol (second and sixth symbol in FIG. 6).

The sequence of bits may allow for error correction coding such as repetition coding, Reed-Muller coding, convolutional coding, turbo coding or the like. This provides a further protection for the content of the confirmation indication.

Alternatively or in addition to the above mentioned multiplexing, the confirmation signal may also be coded in a similar way as existing UCI such as feedback signals for the PDSCH.

For instance, the mapping of the confirmation indication to the sequence of bits and the sequence of bits to the modulation symbols may be performed in such a manner that the values of the confirmation indication have possibly largest Euclidean distance. For example, if the confirmation indication is one bit long and can indicate merely whether or not the data were sent, the two values of the confirmation indication are mapped onto the sequence of bits in such a manner that after performing the modulation, these two values are mapped onto antipodal modulation symbols.

The present disclosure as discussed above provides several benefits. For instance, the base station can reliably detect whether a received uplink transmission is coming from the intended (scheduled) UE or not. Consequently, corruption of HARQ buffer can be avoided. This in turn results in less HARQ or higher layer retransmissions, which leads to a lower delay or higher throughput.

In general, the confirmation indication is not necessarily limited to a single bit. In particular, the confirmation indication may indicate more than merely whether or not current data has been transmitted. For instance, the confirmation signal may provide additional information concerning previous transmission status of the same retransmission process (HARQ process).

For instance, in case the previous transmission for the same retransmission process was executed, the UE may indicate this additional information by "state 1", and the base station in receipt of this additional information state may combine the received data with the data existing in the HARQ buffer. On the other hand in case the previous transmission for the same retransmission process was not executed, the UE may indicate this additional information by "state 2" meaning that the base station can flush the retransmission buffer.

It is noted that the present disclosure is not limited to a particular handling of the receiver of the transmission confirmation indication. The handling may depend on the implementation. For instance, if the combination buffer stores only the result of combination of previous (re)transmissions, then by combining this result with a reception unrelated to the buffered data may destroy the buffer which then needs to be flushed. On the other hand, if the combining buffer stores the received (re)transmissions of the same data separately, it is enough when the erroneously received transmission is removed from the buffer.

The following may be the reasons for not executing the previous transmission: missing or corrupted downlink control information for the preceding subframe of the same retransmission process may be the reason. For the unlicensed carrier (LBT carrier) an additional reason may be a correctly received downlink control information but unavailable scheduled resources. As described above, the unavailability may be caused by another system using the resources. It may be beneficial for the receiver, such as the eNB, to distinguish between these causes. For instance, one state ("state 2.1" may indicate that the transmission was not executed due to a corrupt DCI whereas "state 2.2" may indicate that the transmission was not executed due to non-availability of transmission resources on the unlicensed carrier). Such information could help to improve for case 2.1 the reception quality of the DCI by, e.g., a higher transmit power or a more robust modulation/coding scheme, or for case 2.2 to preferably schedule later data on a different licensed or unlicensed carrier where the non-availability is deemed to be less likely.

Advantageously, this additional information is only included into the confirmation indication in case of a successful transmission. It is noted that the confirmation indication may be also jointly coded with the above described additional information.

Below there are some non limiting examples provided for illustrating of possible confirmation indication and/or additional information states.

TABLE 1

| Confirmation indication | meaning |
|---|---|
| 0 | PUSCH transmitted |
| 1 | PUSCH Not transmitted |

As can be seen from Table 1, the confirmation indication is a confirmation flag which may take two values, one indicating that the scheduled data have been transmitted on the PUSCH and the other value indicating that the scheduled data have not been transmitted on the PUSCH. This example has the advantage of low overhead. Only one bit is necessary to signal this confirmation flag. However, it is noted that this example is also not limited to a single bit—due to padding, coding, multiplexing or further steps, the effective number of bits used for signaling these two states may differ. Alternatively, the information state "PUSCH Not transmitted" could be associated to the case that no confirmation indication is transmitted.

TABLE 2

| Confirmation indication | meaning |
|---|---|
| transmitted, =0 | PUSCH transmitted (may imply DCI is successfully detected) |
| transmitted, =1 | PUSCH not transmitted; DCI is successfully detected |
| not transmitted | PUSCH not transmitted; DCI is not successfully received |

Table 2 shows another example. In this example, the confirmation indication is only transmitted if the DCI was successfully detected. As in the above case the confirmation indication (if transmitted) can take two values: a first value indicating that the uplink data (PUSCH) has been transmitted and a second value indicating that the uplink data was not transmitted. In case the DCI was not successfully received, no confirmation indication is transmitted.

TABLE 3

| Confirmation indication | meaning |
|---|---|
| transmitted, =0 | PUSCH transmitted (suggesting to combine HARQ buffer) |
| transmitted, =1 | PUSCH transmitted (suggesting to overwrite HARQ buffer with currently received data) |
| not transmitted | PUSCH not transmitted |

Table 3 illustrates another example in which the confirmation indication is only transmitted if the data has been transmitted. The confirmation indication (if transmitted) in this example can take two values: a first value which signals that the data transmission should be combined with the current HARQ buffer whereas the second value signals that the data transmission should overwrite the HARQ buffer. In case the data could not be transmitted for instance due to carrier sensing indicating that the resources granted are not available (and/or DCI not received), no confirmation indication is transmitted. Such a lack of conformation indication transmission could be detected for example by a reception of insufficient power (i.e., below a threshold—where it should be understood that the exact threshold value would need to be determined by the receiver implementation) on the expected confirmation indication resource, or by the detection of one or more errors in case the confirmation indication transmission employs an error detection code such as a CRC. In case that the receiver assumes that no PUSCH is transmitted, it would not update the HARQ buffer accordingly.

TABLE 4

| Confirmation indication | Additional information | meaning |
|---|---|---|
| 0 | 0 | PUSCH according to current assignment is transmitted; Preceding PUSCH transmitted (suggesting to combine HARQ buffer) |
| 0 | 1 | PUSCH according to current assignment is transmitted; Preceding PUSCH not transmitted (suggesting to overwrite HARQ buffer with currently received data) |
| 1 | | PUSCH according to current assignment is not transmitted; |

Table 4 shows an example in which the confirmation indication can take two values similarly as in Table 1. In addition, if the confirmation indication indicates that the data was transmitted, and additional information is included which distinguishes between two states namely whether or not the previous data transmission has been performed.

It is noted that these examples are not to limit the present disclosure. For instance, the assignment of values 0 and 1 may be performed differently. Moreover, any other coding may also be applied. For instance, instead of coding confirmation information and coding conditionally on the value of the coding information that additional information, the joint coding may be applied as exemplified in Table 5 below. Accordingly, the confirmation indication can take three values.

TABLE 5

| Confirmation indication | meaning |
|---|---|
| 00 | PUSCH according to current assignment is transmitted; Preceding PUSCH transmitted (suggesting to combine HARQ buffer) |
| 01 | PUSCH according to current assignment is transmitted; Preceding PUSCH not transmitted (suggesting to overwrite HARQ buffer with currently received data) |
| 10 | PUSCH according to current assignment is not transmitted; |

As also mentioned above, the values of the confirmation indication in the above tables do not necessarily correspond to the number of bits effectively used for conveying the confirmation indication. Rather, the tables indicate the minimum number of bits necessary.

According to another embodiment of the present disclosure the confirmation indication is not transmitted on the PUSCH but rather on PUCCH (physical uplink control Channel). It is noted that this embodiment can also be combined with the embodiment above. For instance, in case there is a co-pending UCI for a downlink transmission, the confirmation indication is transmitted on PUSCH whereas if there is no co-pending UCI for a downlink transmission, the confirmation indication is transmitted on PUCCH. However, the present disclosure is not limited thereto and the system may be configured to always add up to signaling on PUCCH.

The PUCCH resource is preferably reserved by a semi-static configuration. In particular, radio resource control protocol may include an information element specifying the corresponding PUCCH resource for transmitting the confirmation indication. The configuration of this resource may be included within any bearer setup or modification procedure.

Moreover, it is advantageous to transmit confirmation signal on the PUCCH of a licensed carrier, preferably the PCell. As described above, the corresponding PUCCH resource may be reserved by the radio resource control (RRC) protocol configuration. The location of the PUCCH resource on the primary cell provide some more reliable transmission then transmitting the control information on the carrier for which it is issued (unlicensed carrier). Moreover, for an unlicensed carrier scenario, the confirmation indication on the PUCCH of the primary cell maybe always transmitted irrespectively of whether or not the unlicensed cell is available. In other words, if the unlicensed cell resources are not available because of collision with other transmissions, neither data nor the confirmation can be transmitted. For these cases, it is beneficial to transmit the confirmation indication on another cell (carrier).

It is advantageous if, as described above, the confirmation indication can be mapped on the same subframe in which the data was transmitted. In particular, such approach results in lower delays. However, the present disclosure is not limited thereto. Rather, the confirmation indication may be transmitted (on either of PUSCH or PUCCH) in a subframe later than the subframe in which the data was transmitted. This is particularly beneficial if the confirmation is treated like other UCI such as ACK/NACK. For example in a time division duplex (TDD) access scheme, where the UCI for multiple downlink transmissions are collected and bundled/multiplexed within a single uplink feedback transmission subframe.

In accordance with another exemplary embodiment, the confirmation indication indicates at least two of the following states:

The DCI granting the UL transmission has been received, and the corresponding uplink transmission was executed. This is a positive acknowledgement (ACK) of the data transmission, i.e., confirmation that the data could be transmitted.

The DCI granting the UL transmission has been received, but no uplink transmission occurs. This state may occur for instance due to an occupied channel on an unlicensed carrier. The signaling state is similar to discontinuous transmission (the DTX) since the UE refrains from transmitting the data for a certain time namely the time period in which the channel is occupied.

No DCI granting the uplink transmission has been detected. This status is similar to negative acknowledgement (NACK) since in such case there is no transmission at all.

By associating the above states with the terminology used for HARQ-ACK feedback (i.e., ACK, NACK, DTX) it is easily possible to treat the confirmation signal like an additional HARQ-ACK information for purposes of transmitting the confirmation indication instead or in addition to HARQ-ACK information. This allows a simple integration into already existing HARQ-ACK related hardware, algorithms, or computer programs. For example, in case multiple HARQ-ACK information is multiplexed for feedback, 3GPP TS 36.213, section 10.1 incorporated herein by reference defines rules how to obtain the feedback information and/or feedback resource for the case of multiple HARQ-ACK feedback, e.g., in Table 10.1.2.2.1-3 reproduced below as Table 6.

TABLE 6

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

In particular, HARQ-ACK(0) and HARQ-ACK(1) are acknowledgements for two different data blocks, where typically in LTE there is one HARQ-ACK per transport block. The transport blocks may belong to two different component carriers (for aggregation scenario) or to different subframes (TDD scenario).

The third column specifies the resource on which the combination of the two HARQ-ACKs is transmitted. The last column indicates value b(0) and b(1) which is transmitted on the resource of the third column to represent the HARQ-ACK combinations.

Such a table or set of rules is then beneficially adapted to treat the confirmation indication like a HARQ-ACK indication. This is exemplified in the following Tables 7 and 8. For instance, the confirmation indication is handled like HARQ-ACK(0) (cf. Table 7) or as HARQ-ACK(1) (cf. Table 8).

This allows different resolutions of the confirmation signal. For example, in case of treating the confirmation like HARQ-ACK(1) in the example below, it is generally not possible to distinguish the NACK and DTX states, i.e., the feedback does not allow the feedback receiver to differentiate between no PUSCH transmission due to a missing DCI (NACK) and no PUSCH transmission due to a busy uplink resource (DTX). Treating the confirmation signal like HARQ-ACK(0) on the other hand allows such a differentiation at least for the case that HARQ-ACK(1)=NACK/DTX.

TABLE 7

| Confirmation Indication | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

TABLE 8

| HARQ-ACK(0) | Confirmation Indication | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | No Transmission | |

In other words, according to an embodiment, the confirmation indication is coded jointly with ACK/NACK/DTX feedback (transmission acknowledgement). Both the transmission acknowledgement and the confirmation indication may take three values (ACK, NACK, DTX).

For the transmission acknowledgement, ACK means positive acknowledgement (data decoded successfully), NACK means negative acknowledgement (data not decoded successfully), DTX means discontinuous transmission (data not received, for instance due to missing DCI).

For the confirmation indication, as described above, "ACK" means data transmitted, "NACK" means data not transmitted due to unavailable resources, and "DTX" means data not transmitted due to missing DCI. Especially for a case as shown in Tables 7 and 8, where it is not fully possible to distinguish unambiguously between the NACK and DTX states from the feedback parameters n(1)_PUCCH and (b(0), b(1)), it is reasonable to associate the NACK and DTX states with conditions that share similarities. As "data not transmitted due to unavailable resources" and "data not transmitted due to missing DCI" shares the aspect that "data is not transmitted", it is beneficial to associate these two states with NACK and DTX—where it should be obvious to those skilled in the art that alternatively, "DTX" could mean data not transmitted due to unavailable resources, and "NACK" could mean data not transmitted due to missing DCI.

As can be seen from the above Tables 7 and 8, a combination of a transmission acknowledgement and confirmation indication determines the resource (n(1)_PUCCH,I with i=0 or 1) on which it is transmitted and the value which is transmitted (b(0), b(1)), where it should be understood that (b(0), b(1)) are subject to further processing steps such as coding and modulation. In other words, combination of a transmission acknowledgement and confirmation indication at the receiver is obtained based on the resource on which it is received and based on the value received.

The above example is not to limit the present disclosure. Rather, for instance, a combination of two or more confirmation indications may be transmitted instead of a combination of ACK and confirmation indication.

It is noted that the above Tables 7 and 8 illustrate examples in which two transmission acknowledgements (HARQ-ACK(0) and HARQ-ACK(1) or confirmation indications) are bundled. However, neither the standard (for bundling ACKs) not the present disclosure (for bundling confirmation indications and possibly ACKs) are limited to bundling two elements. Rather, one or more confirmation indications may be bundled with none, one or more transmission acknowledgements. Such configurations may be of particular advantage for component carrier aggregation, where HARQ-ACK for transport blocks received on different component carriers are bundled for efficient transmission of the HARQ-ACK, and/or time-domain bundling such as for TDD where HARQ-ACK for transport blocks received in different subframes are bundled for efficient transmission of the HARQ-ACK.

The advantage of conveying these three states is that the base station has a detailed knowledge about uplink transmission state and about the reasons in case of no transmissions.

Such knowledge can be used to further improve the transmission quality. For instance, if the DCI failed to be detected correctly, the scheduling entity (base station) may use this information to increase robustness of DCI transmission for future DCI transmissions. This may be achieved, for instance, by increasing the power of the DCI transmission, or by adapting the modulation and coding scheme therefor. If the reason is unavailability of the channel detected by carrier sensing, the scheduling entity may decide to schedule the transmission on another carrier or later on the same carrier, or the like.

FIG. 7 shows an exemplary method for transmitting a data in subframes of a wireless communication system. The wireless communication system may be any system such as LTE/LTE-A. However, this disclosure is not limited thereto and other systems may also make use of this disclosure. In the figure, the system is illustrated by means of its two entities, base station (BS) and a user equipment (UE). However, it is noted that the entities may also be two similar devices, of which one at least temporarily provides a grant for transmission of the other device. The present disclosure is generally not limited to uplink and may also be applied, especially if the DCI for a data transmission and the corresponding data transmission occur in different time instances (e.g., subframes) where the CCA for both events could yield different results (such as "clear" for the DCI but "busy" for the corresponding data transmission).

The method includes the following steps (which may be performed by a user equipment, UE device): receiving 740 a grant for transmitting data on predetermined resources of an uplink carrier and detecting 755 by carrier sensing 750 whether or not the predetermined resources are available for transmission. If the predetermined resources are detected to be available for transmission, transmitting 760 data in the predetermined resources and transmitting 770 a transmission confirmation indication indicating that the data has been transmitted. It should be noted that steps 760 and 770 are not necessarily tied to the same transmission resource (such as time/frequency resource)

The grant may include resource allocation, which indicates resources on which the data are to be transmitted. The carrier sensing may be a mere detection of power of detection of a predetermined or predefined reference signal. The carrier sensing may correspond to the above referred CCA or LBT procedure. In general, the carrier sensing 750 includes measuring certain reception value such as power or quality of reception of a reference signal. The judgment 755 on whether the resources are available is then performed based on the measurement, for instance by comparing the measured value with a certain threshold value, which may be pre-set (fixed or configurable.

The above methods may include, if the predetermined resources are detected not to be available, not transmitting the data in the predetermined resources and transmitting the transmission confirmation indication indicating that the data has not been transmitted.

As can be seen in FIG. 7, a method is also provided for receiving data in subframes of a wireless communication system. This method may be complementary to the above transmitting method, meaning that it may receive data and control signals transmitted by the above methods as is also illustrated in the figure. Such method may be performed by a base station. However, as mentioned above, the present disclosure is not limited thereto and the method may also be executed by any other receiving device.

The data reception method includes generating an uplink grant for a user equipment to transmit data on predetermined resources of an uplink carrier; transmitting 710 the generated grant; receiving 720 data in the predetermined resources; and receiving 730 a transmission confirmation indication indicating that the data has been transmitted by the user equipment.

Advantageously, the transmission confirmation indication is transmitted multiplexed within a physical resource block in adjacency of demodulation reference signal, wherein the physical resource block is a time-frequency resource consisting of a predetermined number of subcarriers and time symbols. The adjacency may beneficially include a direct adjacency in the time domain, i.e., the confirmation indication is mapped onto a symbol adjacent to the symbol carrying DM-RS. The symbol in case of LTE/LTE-A is for instance in the uplink an SC-FDMA symbol. However, it is noted that LTE/LTE-A are only exemplary embodiments and the symbol may be formed in time in a different manner.

The transmission confirmation indication is advantageously mapped onto the same subcarrier as the DM-RS signal. Moreover, the adjacency to the DM-RS signal may include the adjacency in frequency domain. For instance, the transmission confirmation may be mapped onto subcarriers neighboring the subcarrier on which the DM-RS is transmitted.

In other words, according to an embodiment, the transmission confirmation indication is mapped onto the time-frequency resource grid into a symbol neighboring to the symbol carrying DM-RS and the mapping is performed along the frequency domain, i.e., into one or more consecutive subcarriers.

The transmission confirmation indication may be multiplexed onto the physical resource block of a physical uplink shared channel (PUSCH) alongside with feedback information comprising at least one of positive or negative acknowledgement, rank indicator, precoding matrix indicator and channel quality information concerning a parallel downlink transmission.

Alternatively, the transmission confirmation indication may be transmitted on a physical uplink control channel resource (PUCCH).

The transmission of the confirmation indication may be configured semi-statically by radio resource control protocol signaling. For instance, the RRC may configure whether or not the confirmation is to be sent for transmissions on a certain carrier. Accordingly, it is possible to configure transmission of the confirmation indicator for particular carriers such as unlicensed carriers (carriers for which carrier sensing is to be performed before data transmission). Moreover, the transmission of the confirmation indication may be configured for unlicensed carriers which are operated in an environment in which also other system is operating.

In order to increase robustness and efficiency of the transmission confirmation indication, the transmission confirmation indication is transmitted on a physical uplink control channel resource of a carrier for which carrier sensing is not performed. For instance, the transmission confirmation indication may be sent on a licensed carrier, advantageously on a primary cell.

The transmission confirmation indication may indicate one of the following states:
   the uplink grant has been received and the data transmission has been executed;
   no uplink grant has been detected;
   the uplink grant has been received, but no transmission of data has been executed.

For example, the confirmation indication may take two values, one indicating that the uplink grant has been received and the data transmission has been executed while the other value indicating that either no grant was received or the transmission was not performed.

According to another example, the confirmation indication may take more than two values and distinguish also the state where no uplink grant has been detected from the state in which the uplink grant has been received, but no transmission of data has been executed.

It is noted that the UE may determine whether or not uplink grant was sent but not detected if the blind decoder does not detect any uplink grant on the (E)PDCCH in a particular subframe although request for grant has been transmitted to the scheduling entity.

Advantageously, the transmission confirmation indication further indicates either that the data transmitted is to be combined with buffered data from previous transmissions or that the data transmitted is to replace the content of the buffer. Accordingly, at the transmission confirmation indication receiving side, the handling may depend on the value of the transmission confirmation indication and may include either combining or flushing the current buffer.

Moreover, the confirmation indication may indicate status of the current uplink hybrid automatic repeat request, HARQ, process if the confirmation indication indicates that the data has been transmitted; and the status indicates whether or not a preceding transmission of the data was successful. This may help the receiver of the confirmation indication (BS) to manage the combining buffer as described above.

The confirmation indication is preferably coded using forward error correction coding, i.e., by adding a redundancy.

For simplicity reasons, above described methods have focused on the case that one grant and one data transmission occurs. In a carrier aggregation scenario, multiple such grants and data transmissions could occur at the same time. The described methods can be applied to such a scenario in a way that the confirmation indication is determined and transmitted per grant and carrier, respectively. For example, if two carriers are aggregated, there could be one DCI (grant) that grants resources on two carriers at the same time, or two DCIs (grants) each granting resources on one carrier. The CCA would be executed individually per carrier, and therefore may succeed on one carrier but not the other. Consequently it is beneficial to convey the confirmation indication per carrier. This may be performed, for instance by bundling the confirmation indications as mentioned with reference to Tables 7 and 8. In particular, instead of bundling an acknowledgement (or in addition thereto) with the confirmation indication, more confirmation indications for the respective carriers may be bundled. In other words, similar to the above description of handling a confirmation indication like a HARQ-ACK signal especially for the case where HARQ-ACK feedback is co-pending with the confirmation indication, the case of transmitting multiple confirmation indicators preferably follows rules like those for handling multiple HARQ-ACK feedback.

As explained above, in a carrier aggregation scenario, when some of the assigned carriers are not available for transmission (e.g., due to a failed CCA), the UE gives a corresponding confirmation indication to inform the receiver on which of the carriers transmissions were conducted and on which carriers transmissions were not conducted. This may be extended or replaced to the case where the UE is given grants for a plurality of carriers, but where the UE chooses to transmit potentially only on a subset of carriers. For example, an eNB could send DCI including grants for multiple uplink carriers, however requesting only transmission on one of those carriers. This leaves a choice to the UE which carrier is used for transmissions. Some of the carriers may not be eligible due to, e.g., a failed CCA, however it is still possible that the UE has the choice of 2 or more carriers where it could transmit. In this case, the confirmation indication is useful to indicate on which carrier the transmission occurs. If so desired, the additional information can further include as reason a case that the carrier is available (such as CCA is successful), however the carrier was not chosen for transmission by the UE. In this way, the confirmation indication can be also particularly applicable in a case where no grants for unlicensed carriers are given, but rather only grants for licensed carriers; the UE could then preferably use the confirmation indication for the case of choosing which carriers are used for transmission, and/or to indicate whether a grant for a specific carrier has been received or not.

In an exemplary embodiment, the confirmation signal could then indicate the states as shown in Table 9, where preferably a confirmation indication is obtained per granted carrier, or alternatively for each carrier in the set of available carriers.

TABLE 9

| Confirmation indication | meaning |
| --- | --- |
| transmitted, =00 | PUSCH transmitted on the carrier (may imply DCI is successfully detected) |
| transmitted, =01 | PUSCH not transmitted; DCI is successfully detected but the carrier is busy (e.g., CCA fail) |
| transmitted, =10 | PUSCH not transmitted; DCI is successfully received but the UE chooses not to transmit on the carrier |
| transmitted, =11 | PUSCH not transmitted; DCI is not successfully received |

In other words, the confirmation indication may take one of four values including a first value indicating that uplink grant was received and the data transmitted, a second value indicating that the uplink grant was received but the data has not been transmitted due to carrier sensing indicating that the resources are not available, a third value indicating that the uplink grant was received but the data has not been transmitted since the transmitter has decided not to transmit data on those resources, and a fourth value indicating that the DCI was not received and thus no data has been transmitted.

In an embodiment, the confirmation indication is bundled with acknowledgement feedback information regarding a downlink transmission, the bundled confirmation indication and the acknowledgement feedback is transmitted on a predetermined resource. As explained above, the confirmation indication as well as the acknowledgement feedback advantageously takes 3 values, ACK, NACK and DTX. Beneficially, the bundle of the confirmation indication and acknowledgement feedback information may take less values than the number of all possible combinations of ACK/NACK/DTX for both elements. The above described methods are readily applicable to wireless communication system being an LTE/LTE-A based system operating on a carrier for which listen before talk procedure is to be performed before transmission. However, it is noted that the present disclosure is not limited to these systems.

Figure 10:
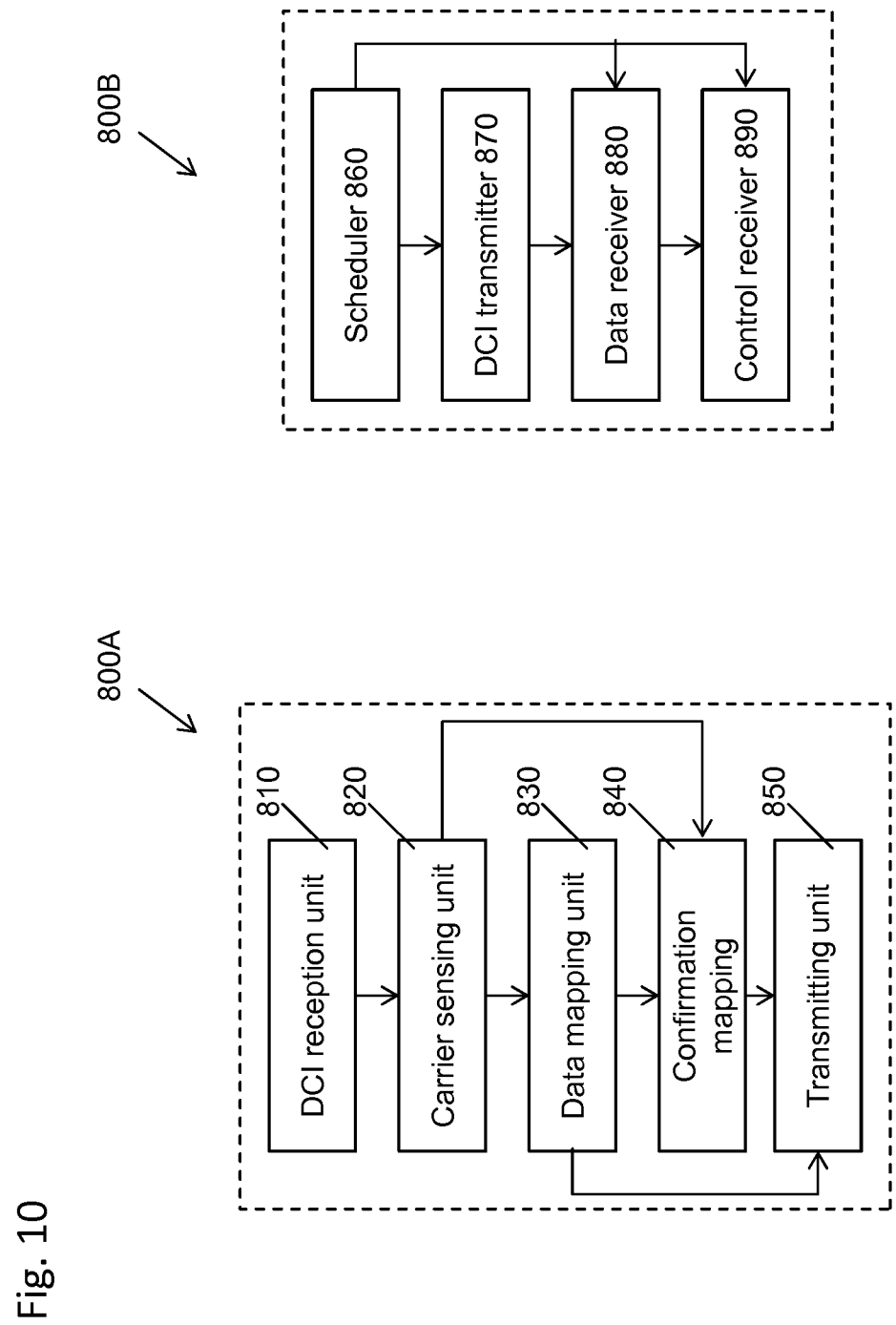
FIG. 10 is a block diagram illustrating apparatuses for uplink communication on an LBT carrier.

FIG. 10 illustrates improved exemplary devices. An apparatus 800A for transmitting a data in subframes of a wireless communication system is shown on the left hand side, including: reception unit 810 for receiving an uplink grant for transmitting data on predetermined resources of an uplink carrier; carrier sensing unit 820 for detecting by carrier sensing whether or not the predetermined resources are available for transmission; transmitting unit 850 for, if the predetermined resources are detected to be available for transmission, transmitting data in the predetermined resources and transmitting a transmission confirmation indication indicating that the data has been transmitted.

As is shown in FIG. 10, the data and the confirmation indication may be mapped onto the resources to be transmitted by the transmitting unit 850 in the respective mapping units 830 and 840. The mapping and the signaling of the confirmation information is performed according to any of the embodiments and examples above. The apparatus for transmitting the data is advantageously a UE transmitting data in uplink to a base station such as eNB of LTE/LTE-A. However, it may be also another device.

Correspondingly, on the right hand side of FIG. 10, an apparatus 800B is shown for receiving data in subframes of a wireless communication system, including: scheduler 860 for generating an uplink grant for a user equipment to transmit data on predetermined resources of an uplink carrier; data receiver 880 for receiving data in the predetermined resources; and control receiver 890 for receiving a transmission confirmation indication indicating that the data has been transmitted by the user equipment.

As shown in FIG. 10, the exemplary receiver 800B may comprise transmitting unit 870 for transmitting the DCI generated by the scheduler 860. Moreover, it is noted that the data receiving unit 880 and the control information receiving unit 890 may in fact be implemented as one reception unit and a demapper for demultiplexing (demapping) the data and the confirmation information from the received signal.

The receiver of data 800B may be a base station such as eNB of the LTE/LTE-A. In general, the receiver 800B may be any device performing scheduling of the transmission by another device 800A. In particular, in a device to device communication without involvement of a base station, the receiver 800B may be a device such as user equipment temporary performing scheduling.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present disclosure relates to transmitting and receiving data in subframes of a wireless communication system. It includes at the user equipment receiving an uplink grant for transmitting data on predetermined resources of an uplink carrier; detecting by carrier sensing whether or not the predetermined resources are available for transmission; and if the predetermined resources are detected to be available for transmission, transmitting data in the predetermined resources and transmitting a transmission confirmation indication indicating that the data has been transmitted. At the receiving side, the transmission confirmation indication is transmitted and based on, the received data is handled.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for transmitting, by a user equipment, data in subframes of a wireless communication system, the method comprising:
   receiving an uplink grant for transmitting data on predetermined resources of an uplink carrier;
   detecting by carrier sensing whether or not the predetermined resources are available for transmission;
   in response to detecting the predetermined resources are available for transmission, transmitting data in the predetermined resources and transmitting a transmission confirmation indication indicating that the data has been transmitted in the predetermined resources; and
   in response to detecting the predetermined resources are unavailable for transmission, transmitting the transmission confirmation indication indicating that the data has not been transmitted in the predetermined resources,
   wherein the transmission confirmation indication is transmitted in a first set of physical resource blocks that are immediately adjacent to a second set of physical resource blocks, and the second set of physical resource blocks include a demodulation reference signal.

2. The method according to claim 1,
   wherein each of the first set of physical resource blocks and the second set of physical resource blocks is a time-frequency resource consisting of a predetermined number of sub-carriers and time symbols.

3. The method according to claim 2, wherein
   the first set of physical resource blocks and the second set of physical resource blocks are in one or more consecutive subcarriers; and
   each of the first of physical resource blocks and the second set of physical resource blocks is a resource of a physical uplink shared channel.

4. The method according to claim 1, wherein the transmission confirmation indication is transmitted on a physical uplink control channel resource.

5. The method according to claim 4, wherein the transmission confirmation indication is configured semi-statically by radio resource control protocol signaling.

6. The method according to claim 4, wherein the transmission confirmation indication is transmitted on a physical uplink control channel resource of a carrier for which carrier sensing is not performed.

7. The method according to claim 4, wherein the transmission confirmation indication is configured to indicate a state chosen from a group of states including:
   a state in which the uplink grant has been received and the data has been transmitted in the predetermined resources;
   a state in which no uplink grant has been detected; and
   a state in which the uplink grant has been received and the data has not been transmitted in the predetermined resources.

8. The method according to claim 1, wherein
the confirmation indication indicates status of the current uplink hybrid automatic repeat request, HARQ, process in a case of the confirmation indication indicating that the data has been transmitted in the predetermined resources; and
the status indicates whether or not a preceding transmission of the data was successful.

9. The method according to claim 1, wherein the confirmation indication is coded using forward error correction coding.

10. The method according to claim 1, wherein
the confirmation indication is bundled with acknowledgement feedback information regarding a downlink transmission,
the bundled confirmation indication and the acknowledgement feedback is transmitted on a predetermined resource.

11. The method according to claim 1, wherein, in response to detecting the predetermined resources are available for transmission, the transmission confirmation indication further indicates either that the data transmitted is to be combined with buffered data from previous transmissions or that the data transmitted is to replace content of a buffer.

12. The method according to claim 1 wherein the transmission confirmation indication indicating that the data has been transmitted in the predetermined resources is transmitted in the same subframe as the data.

13. The method according to claim 1 wherein the first set of physical resource blocks are immediately adjacent to the second set of physical resource blocks and a third set of physical resource blocks, and the third set of physical resource blocks include an ACK/NACK signal.

14. The method according to claim 1 wherein the transmission confirmation indication is configured to indicate a state chosen from a group of states including:
a state in which the data has been transmitted in the predetermined resources, and the data is to be combined with buffered data from previous transmissions;
a state in which the data has been transmitted in the predetermined resources, and the data is to replace the buffered data from previous transmissions; and
a state in which the data has not been transmitted in the predetermined resources.

15. A method for receiving, by a base station, data in subframes of a wireless communication system, the method comprising:
generating and transmitting an uplink grant for a user equipment to transmit data on predetermined resources of an uplink carrier;
in response to the user equipment detecting the predetermined resources are available for transmission, receiving data in the predetermined resources and receiving a transmission confirmation indication indicating that the data has been transmitted in the predetermined resources by the user equipment; and
in response to the user equipment detecting the predetermined resources are unavailable for transmission, receiving the transmission confirmation indication indicating that the data has not been transmitted in the predetermined resources,
wherein the transmission confirmation indication is received in a first set of physical resource blocks that are immediately adjacent to a second set of physical resource blocks, and the second set of physical resource blocks include a demodulation reference signal.

16. An apparatus for transmitting a data in subframes of a wireless communication system, the apparatus comprising:
a reception unit, which, in operation, receives an uplink grant for transmitting data on predetermined resources of an uplink carrier;
a carrier sensing unit, which, in operation, detects by carrier sensing whether or not the predetermined resources are available for transmission; and
a transmitting unit, which, in operation,
in response to the predetermined resources being detected to be available for transmission, transmits data in the predetermined resources and transmits a transmission confirmation indication indicating that the data has been transmitted in the predetermined resources, and,
in response to the predetermined resources being detected to be unavailable for transmission, transmits the transmission confirmation indication indicating that the data has not been transmitted in the predetermined resources,
wherein the transmission confirmation indication is transmitted in a first set of physical resource blocks that are immediately adjacent to a second set of physical resource blocks, and the second set of physical resource blocks include a demodulation reference signal.

17. An apparatus for receiving data in subframes of a wireless communication system, the apparatus comprising:
a scheduler, which in operation, generates an uplink grant for a user equipment to transmit data on predetermined resources of an uplink carrier;
a transmitter, which, in operation, transmits the uplink grant to the user equipment; and
a receiver, which, in operation,
in response to the predetermined resources being detected, by the user equipment, to be available for transmission, receives data in the predetermined resources and receives a transmission confirmation indication indicating that the data has been transmitted in the predetermined resources by the user equipment, and,
in response to the predetermined resources being detected, by the user equipment, to be unavailable for transmission, receives the transmission confirmation indication indicating that the data has not been transmitted in the predetermined resources,
wherein the transmission confirmation indication is received in a first set of physical resource blocks that are immediately adjacent to a second set of physical resource blocks, and the second set of physical resource blocks include a demodulation reference signal.

* * * * *